United States Patent [19]

Kuroda

[11] Patent Number: 5,048,930
[45] Date of Patent: Sep. 17, 1991

[54] ELECTRO-OPTICAL DEVICE

[75] Inventor: Yoshimi Kuroda, Tokyo, Japan

[73] Assignee: Seiko Instruments Inc., Japan

[21] Appl. No.: 324,227

[22] Filed: Mar. 14, 1989

[30] Foreign Application Priority Data

Mar. 17, 1988 [JP] Japan .................................. 63-64379

[51] Int. Cl.$^5$ .................................................. G02F 1/13
[52] U.S. Cl. ....................................... 359/58; 350/334; 340/784
[58] Field of Search ................ 350/333, 334; 437/100, 437/101; 340/784

[56] References Cited

U.S. PATENT DOCUMENTS

| | | | |
|---|---|---|---|
| 4,362,766 | 12/1982 | Dannhaüser et al. | 437/100 |
| 4,732,873 | 3/1988 | Perbet et al. | 437/101 |
| 4,828,370 | 5/1989 | Suzuki | 350/333 |
| 4,842,372 | 6/1989 | Toyama | 350/333 |
| 4,871,234 | 10/1989 | Suzuki | 350/333 |
| 4,895,789 | 1/1990 | Motte et al. | 350/334 X |
| 4,941,735 | 7/1990 | Moddel et al. | 350/333 X |

FOREIGN PATENT DOCUMENTS

| | | | |
|---|---|---|---|
| 0124272 | 9/1980 | Japan | 437/101 |
| 0057617 | 4/1985 | Japan | 407/101 |

OTHER PUBLICATIONS

Brodsky et al., "Doping of Sputtered Amorphous Semiconductors", IBM, vol. 19, No. 12, May 1977, pp. 4802–4803.

*Primary Examiner*—Stanley D. Miller
*Assistant Examiner*—Huy K. Mai
*Attorney, Agent, or Firm*—Bruce L. Adams; Van C. Wilks

[57] ABSTRACT

The present invention provides an electro-optical device having switching elements such as non-linear resistance elements and TFTs using a-Si as the base material, wherein the a-Si film substantially does not contain hydrogen so that it has no photoelectric effect and thus become a stable and reliable device.

24 Claims, 5 Drawing Sheets

ELECTRO-OPTICAL DEVICE

BACKGROUND OF THE INVENTION

This invention relates to an electro-optical device having a large number of pixels for use in a personal computer display, a hand-held computer display, displays of various measuring instruments, television receivers, printer shutters, and so forth.

The inventors of the present invention have heretofore developed a non-linear resistance element or a—Si TFT using a silicon nitride film, a silicon oxide film, a silicon nitride oxide film or a silicon carbide film as a non-linear resistance thin film. These are described, for example, in Japanese Patent Laid-Open No. 90192/1986 and No. 94086/1986

Since these electro-optical switching elements using a—Si as the base material are formed by chemical reaction between different gases in a plasma CVD apparatus to deposit a film, H mixes unavoidably into the base a—Si film. To produce a non-linear resistance element having $SiN_x$ ($N/Si=0.4\sim0.8$), for example, an $SiH_4$ gas is reacted chemically with an $N_2$ gas or an $NH_3$ gas to form the film so that the decomposed H component of the $SiH_4$ gas or the H component of $NH_3$ mixes unavoidably in an amount of 10 to 20% into the resulting $SiN_x$ film. When a non-linear resistance element of $SiO_x$ is formed, too, the $SiH_4$ gas is used likewise so that 10 to 20% of the decomposed H component of the $SiH_4$ gas mixes into the $SiO_x$ film.

Since the switching element using H-containing amorphous silicon (hereinafter referred to as "a—Si:H") as the base material exhibits a photoelectric effect peculiar to a—Si:H, the electric characteristics of the element change depending on the atmosphere (brightness and darkness) around the element. In the case of a non-linear resistance element (see FIGS. 1 and 2) having a structure consisting of transparent pixel electrodes, a wiring electrode and a non-linear resistance film using a—Si:H as the base material and interposed between the former two, the voltage-v-current characteristics between the wiring electrode and the transparent pixel electrode change depending on the brightness and darkness around the element as shown in FIG. 3. If this non-linear resistance element is used for a liquid crystal display such as shown in FIG. 6, a difference of contrast occurs between the bright atmosphere and the dark atmosphere. This reason will be described next.

FIG. 7 is a circuit diagram of a liquid display device using the non-linear resistance element. Reference numeral 13 represents a wiring electrode made of a metal, 17 is a transparent electrode, 16 is a liquid crystal and 15 is a non-linear resistance element. FIG. 8 is an equivalent circuit diagram of one pixel, and symbols $C_1$ and $R_1$ represent the capacitor capacity and the resistance of each non-linear resistance element. $C_{LC}$ and $R_{LC}$ represent the capacitor capacity and the resistance of each liquid crystal. The driving waveform in the matrix liquid crystal panel shown in FIG. 7 is a time division driving waveform shown in FIGS. 9(A) and 10(A) by way of example. When a voltage $V_{op}$ is applied between A and C of FIG. 8, that is, between the non-linear resistance element and the liquid crystal pixel, for a period $T_o$, the charge is stored in the capacitor $C_{LC}$ of the liquid crystal and thereafter, the voltage is applied between A and B and between B and C due to resistance division by $R_1$ and $R_{LC}$ for the period $T-T_o$. If the resistance of $R_1$ is low in the period $T-T_o$, the charge stored in $C_{LC}$ in the period $T_o$ leaks from B to A, that is, through the non-linear resistance element. In short, the area of the oblique line portion at the lower part of FIGS. 9(B) and 10(B) changes with $R_1$. If the value $R_1$ is small, the area of the olique line portion is small and the voltage applied between B and C, that is, the voltage applied to the liquid crystal, is small.

Therefore, in the case of the liquid crystal display whose non-linear resistance element has the electric characteristics such as shown in FIG. 3, the resistance value $R_1$ changes in the dark/bright atmosphere in the low voltage region in the period $T-T_o$ so that the voltage value applied to the liquid crystal changes and the difference of contrast occurs consequently. In the worst case, the characters that have been displayed in the dark atmosphere would disappear and would not be able to be seen if they are abruptly moved to the bright atmosphere. FIG. 10(A) and (B) show the example of the waveform applied between A and C and the waveform of the B—C voltage at the time of OFF.

In an electro-optical device having a switching element using a—Si as its base material, the present invention inhibits the base a—Si film from containing substantially H to eliminate the photoelectric effect (FIG. 4) and to prevent the drop of contrast of the electro-optical device at a bright place.

SUMMARY OF THE INVENTION

The present invention provides an electro-optical device having switching elements such as non-linear resistance elements and TFTs using a—Si as the base material, wherein the a—Si film substantially does not contain hydrogen so that it has no photoelectric effect and thus become a stable and reliable device.

DETAILED DESCRIPTION OF THE INVENTION

The electro-optical device of the present invention solves the problems described above. In an electro-optical device having a switching element using a—Si as the base material, the present invention uses a base a—Si film containing substantially no H.

In the electro-optical device having the switching element using a—Si as the base material, the present invention inhibits the base a—Si film so that it contains substantially no H as described above. In this manner there can be obtained an extremely stable and highly reliable electro-optical device which is free from the photoelectric effect, can prevent the drop of contrast at a bright place as well as the change of electrical characteristics which are believed to result from H when the device is operated for a long period.

Hereinafter, an embodiment of the present invention will be explained with reference to the drawings.

Figure 5:
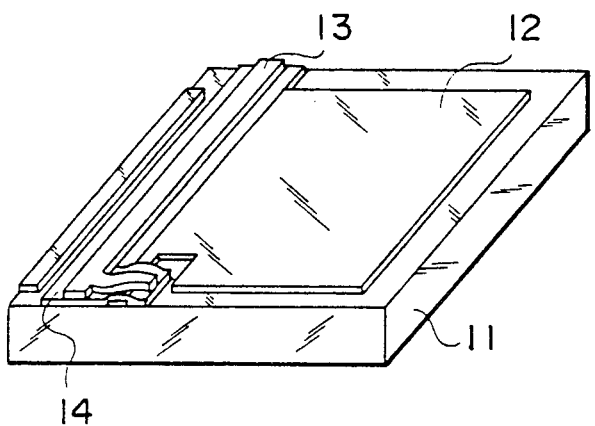
FIGS. 5 and 6 are a perspective view of an electrode structure of a substrate and a longitudinal sectional view of a liquid crystal display, respectively.
Figure 6:
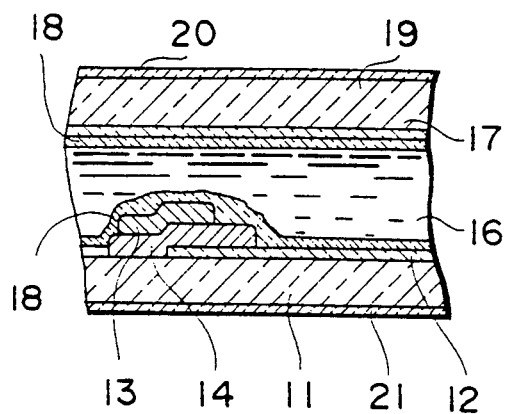
Figure 7:
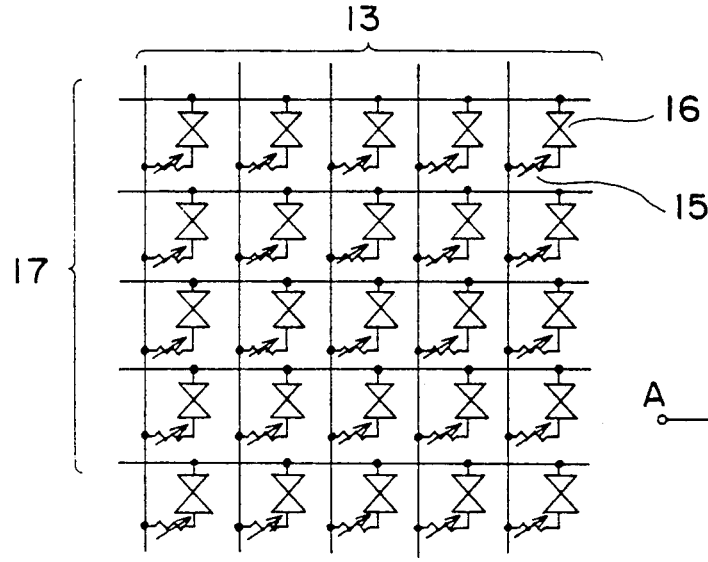
FIG. 7 is a circuit diagram of the liquid crystal display using the non-linear resistance element.

FIG. 5 is a perspective view of an embodiment of the substrate forming a non-linear resistance element of the liquid crystal display in accordance with the present invention. The drawing shows only one pixel, and a liquid crystal layer, an opposed substrate for sealing the liquid crystal, a polarization plate, etc., are omitted from the drawing to simplify illustration. FIG. 6 is a longitudinal sectional view of one pixel of the liquid crystal display in accordance with the present invention. In FIG. 5, reference numeral 11 denotes a transparent substrate, which is made of ordinary glass such as soda glass, Pyrex glass, etc. Reference numeral 12 represents a transparent pixel electrode. It is formed by depositing an indium tin oxide film (ITO) by magnetron sputtering, deposition, or the like, in a thickness of from about 100 Å to 500 Å on the entire surface of the transparent substrate 11 and then patterning it in a predetermined shape by photo-etching. Reference numeral 14 represents an amorphous material consisting principally of silicon. An about 750 to 1,500 Å thick silicon nitride film hardly containing any H is deposited by reactive sputtering by use of a target of silicon single crystal or silicon polycrystal, an argon gas containing about 5 to 15% of nitrogen gas and a magnetron sputtering apparatus. As to the silicon oxide film (SiO$_2$), an about 750 to 1,500 Å thick amorphous silicon oxide film (SiO$_2$) substantially not containing hydrogen is deposited by reactive sputtering using the target of silicon single crystal, silicon polycrystal or silicon oxide and an argon gas containing about 1 to 10% of oxygen gas. Reference numeral 13 represents a wiring electrode, which constitutes one side of the row-column electrodes.

In this embodiment aluminum silicon or chromium metal is deposited continuously in a thickness of from about 1,000 to 8,000 Å on the non-linear resistance thin film 14 inside the same or a separate chamber by magnetron sputtering. Next, the metallic wiring electrode 13 is patterned in a predetermined shape by photo-etching and then the non-linear resistance thin film 14 is patterned in a predetermined shape by photo-etching. In this embodiment the metallic wiring electrode 13 is removed selectively by photo-etching and then the non-linear resistance thin film 14 is etched and removed selectively without removing the photosensitive resin (photoresist). In other words, two photo-masks are used and etching steps are effected three times.

Figure 11:
FIG. 11 is a production step block diagram showing an embodiment of the present invention.
Figure 12:
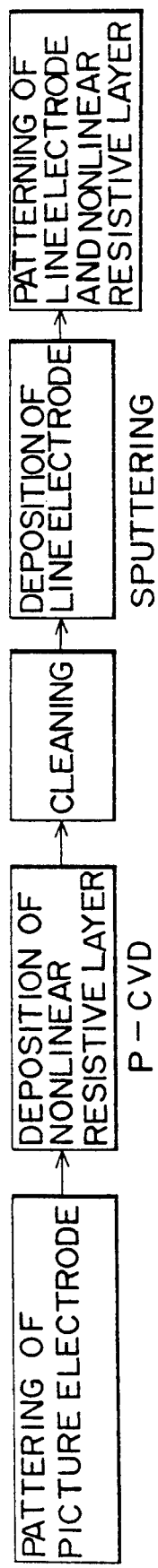
FIG. 12 is a block, diagram showing an example of the conventional production steps.

FIG. 11 is a block diagram of the steps described above in comparison with the conventional steps of the formation of the non-linear resistance element using a—Si:H (a—Si containing H) as the base material shown in FIG. 12. The formation steps of the a—Si:H base non-linear resistance element by use of the plasma CVD apparatus in accordance with the prior art include, as shown in FIG. 12, the first step of depositing the transparent pixel electrode by magnetron sputtering or deposition and patterning it by photo-etching, the second step of raising the substrate temperature above 300° C. inside the plasma CVD apparatus and depositing the non-linear resistance thin film of the silicon nitride film by silane gas and nitrogen gas or ammonia gas, the third step of withdrawing the substrate from the plasma CVD apparatus and washing it, the fourth step of depositing the metal wiring electrode on this substrate by magnetron sputtering and the fifth step of patterning the metallic wiring electrode and the non-linear resistance thin film thus deposited by photo-etching. When the plasma CVD is employed for forming the non-linear resistance thin film, the H component mixes unavoidably into the non-linear resistance thin film so that the resulting device has only inferior electrical characteristics. In accordance with the formation steps of the present invention, however, since the non-linear resistance film 14 is formed by sputtering, it is possible to prevent substantially the mixture of hydrogen. It becomes possible to conduct reactive sputtering by use of the target made of silicon and argon gas containing oxygen gas in the sputtering apparatus, to deposit the non-linear resistance thin film and to continuously deposit the metallic wiring electrode by magnetron sputtering after the first step of depositing the transparent pixel electrode by magnetron sputtering, deposition or the like as shown in FIG. 11. This makes it possible to eliminate the conventional steps of withdrawing the substrate after the deposition of the a—Si:H base non-linear resistance thin film from the CVD apparatus, the washing step of the substrate after withdrawal, and the step of setting the substrate to the sputtering apparatus and evacuating it in order to deposit the wiring electrode. In this manner the production time can be reduced drastically. Since the possibility of attachment of any impurity can thus be reduced drastically, the number of defective products can be reduced and the production yield can be improved.

If the wiring electrode and the non-linear resistance thin film have the same shape, they can be etched continuously by use of the same exposure mask and the same photosensitive resin and by so doing, the steps from deposition of the non-linear resistance film to patterning of the wiring electrode and the non-linear resistance film, that have required seven to eight hours conventionally, can be completed within about four to five hours, thereby reducing the time required for the production steps.

FIG. 6 is a longitudinal sectional view of the liquid crystal display in accordance with the present invention. Reference numeral 16 represents a liquid crystal layer, which is 5 to 7 μm thick and uses a twist nematic material. Reference numeral 18 denotes an orientation film, such as a polyimide film selected in consideration of a dielectric constant and resistance. Reference numeral 12 represents a transparent conductive film (ITO) constituting one of the column-row electrode groups. Reference numeral 19 denotes an upper transparent substrate using the same kind of glass as that of the lower transparent substrate 11. Reference numerals 20 and 21 denote polarization plates and the axes of polarization of the upper and lower polarization plates 20 and 21 are deviated by about 90°.

Figure 1:
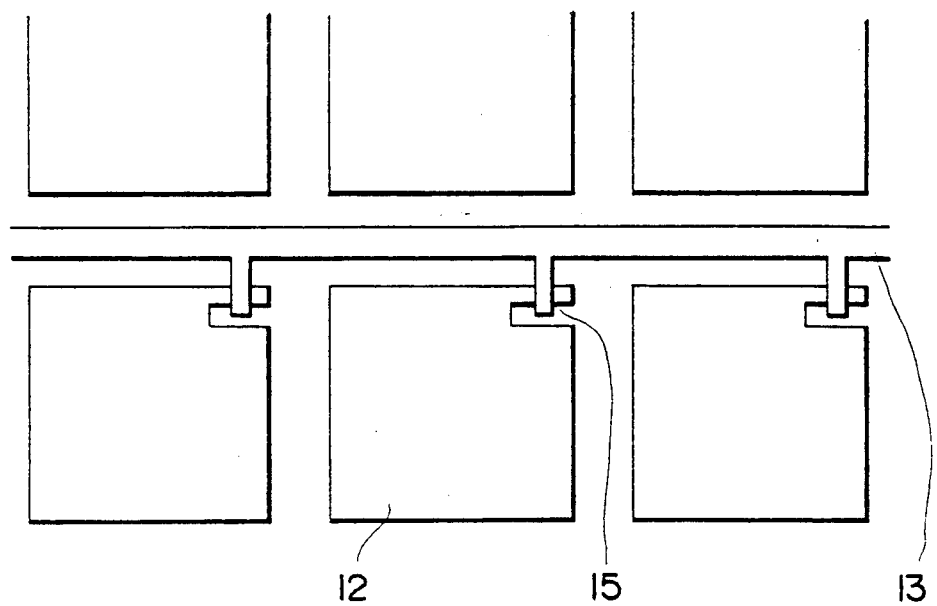
FIG. 1 is a plan view of a pixel electrode showing an embodiment of the present invention.
Figure 2:
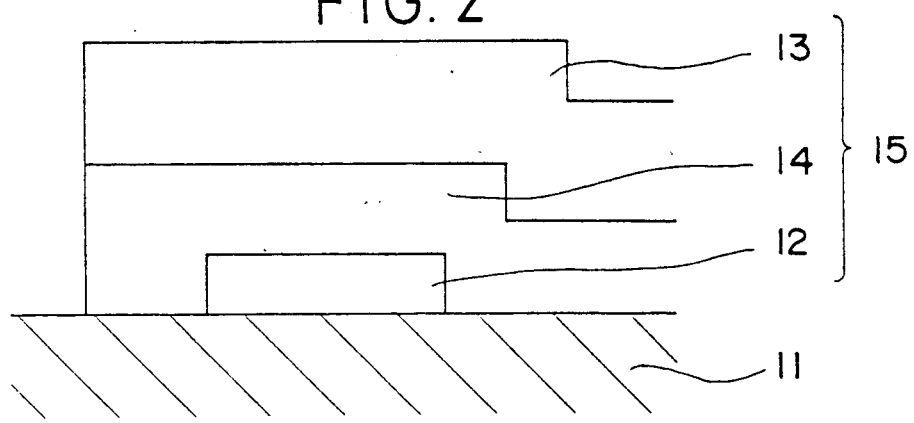
FIG. 2 is a sectional view of a non-linear resistance element.
Figure 3:
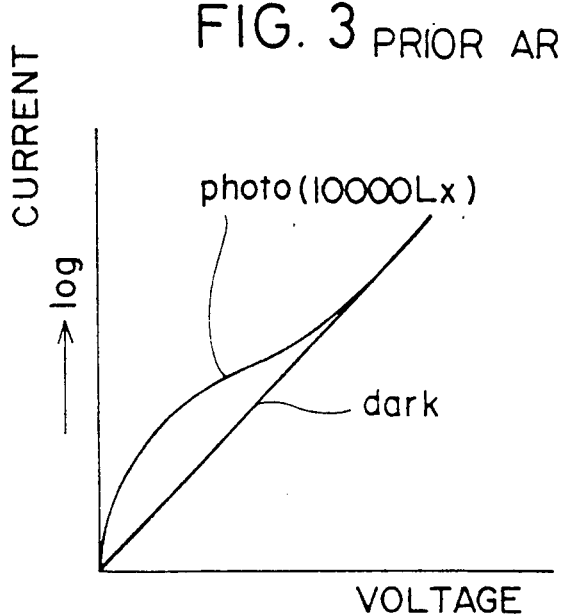
FIG. 3 is an I—V characteristic diagram of a non-linear resistance film using conventional a—Si:H as the base.
Figure 4:
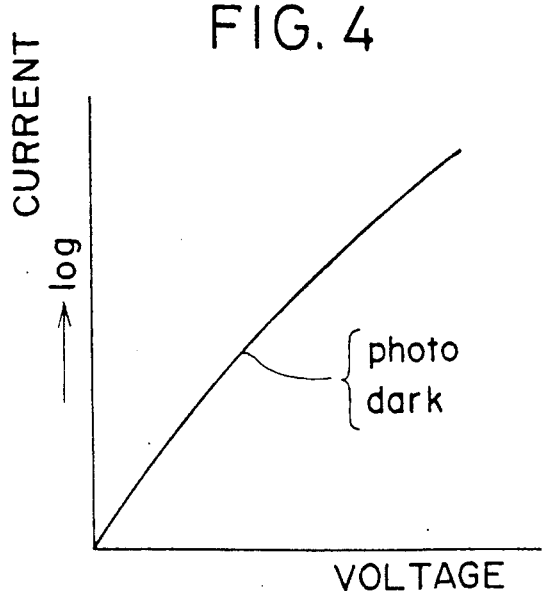
FIG. 4 is an I—V characteristic diagram of a non-linear resistance film using H-free a—Si as the base.

FIG. 4 shows the voltage-v-current characteristics when the ITO film is grounded and a voltage is applied to the metallic wiring electrode in the non-linear resistance element formed by laminating ITO as the transparent pixel electrode, the silicon nitride film not substantially containing hydrogen as the non-linear resistance thin film, and aluminum silicon or chromium as the wiring electrode in accordance with the method of the present invention. FIG. 3 shows the voltage-v-current characteristics of the non-linear resistance element which has the same structure as above but whose silicon nitride film is formed by CVD using the silane gas and the nitrogen gas or the ammonia gas. The ordinate in each diagram represents the current in a logarithmic scale. As can be seen clearly from these diagrams, the resistance drops in a bright atmosphere in the low voltage range due to the photoelectric effect in the case of the non-linear resistance element using H-containing a—Si as a base material and formed by plasma CVD, but no such phenomenon occurs in the case of the non-linear resistance element not containing substantial hydrogen and formed by sputtering. If the hydrogen content is below 1 wt%, the photoelectric effect described above hardly occurs. The same result can be obtained when the silicon oxide film is used as the non-linear resistance thin film. In other words, any adverse influences due to the photoelectric effect hardly occur when an amorphous $SiO_x$ hardly containing hydrogen is formed by sputtering and used as a switching device of the electro-optical device.

Therefore, if the non-linear resistance element having the characteristics such as shown in FIG. 3 is used for the liquid crystal device such as shown in FIG. 6, the difference of contrast occurs between the bright atmosphere and the dark atmosphere but when the non-linear resistance element having the characteristics such as shown in FIG. 4 is used, such a difference of contrast occurs and a little more stable display state is maintained.

Figure 9A:
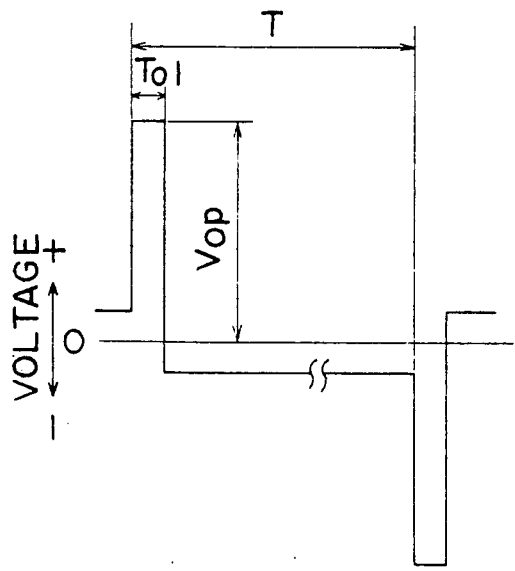
FIGS. 9(A), (B) show examples of the waveform applied between the liquid crystal and the non-linear resistance element AC at the time of ON and the voltage applied between the liquid crystals BC at that time.
Figure 9B:
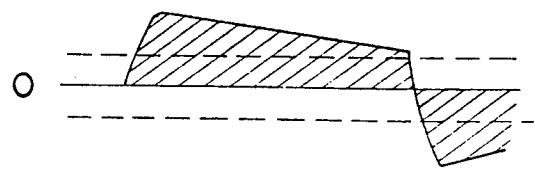
Figure 10A:
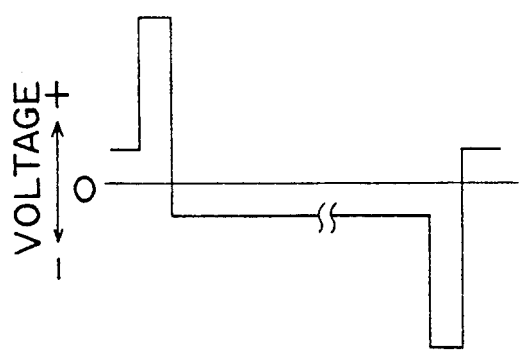
FIGS. 10(A), (B) show examples of the voltages applied between AC and between BC at the time of OFF.
Figure 10B:
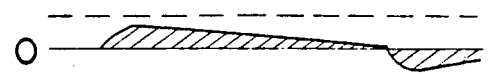
Figure 13:
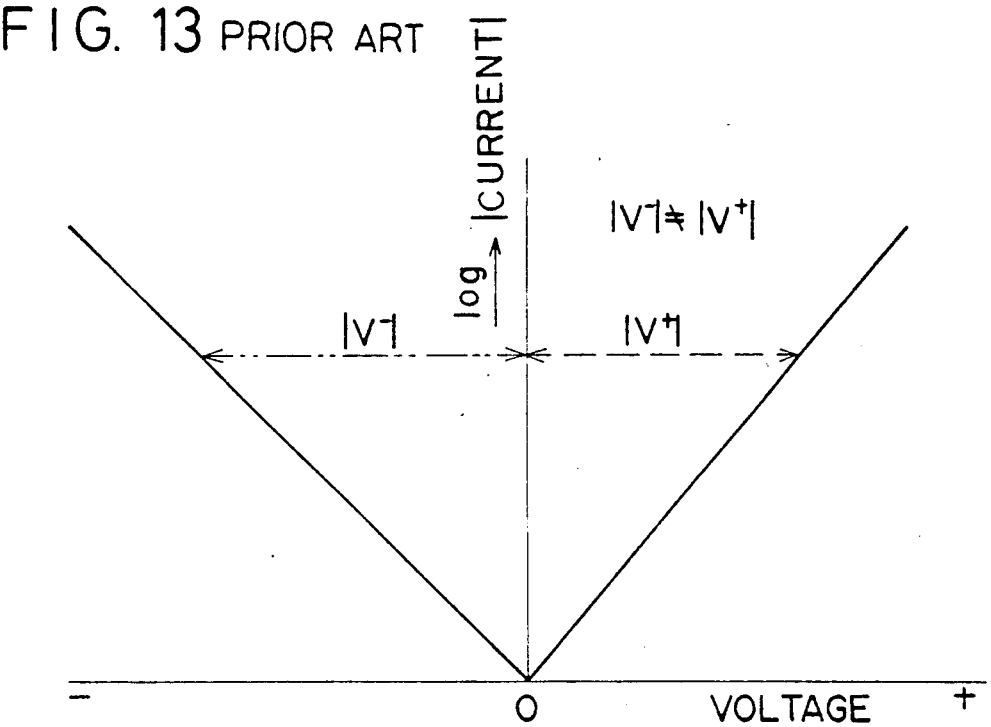
FIG. 13 is a diagram showing asymmetry of the voltage-v-current characteristics of the non-linear resistance element.

When the a—Si:H base non-linear resistance film is deposited by use of plasma CVD in accordance with the prior art, the difference in the electrical characteristics occurs due to the adhesion strength between the interface of the pixel electrode metal-non-linear resistance film and the interface of the non-linear resistance film-wiring electrode, and asymmetry occurs in the voltage-v-current characteristics (see FIG. 13). In other words, even if the same voltage is applied to the pixel electrode metal and the wiring electrode, the value of the current flowing through the non-linear resistance element changes depending on the positive or negative polarity. If such a non-linear resistance element is used for the liquid crystal display, the D.C. component is likely to remain inside the liquid crystal display and results in non-uniform display such as charge-up. However, if the a—Si base non-linear resistance film hardly containing any H (H<1%) is deposited by sputtering as in this embodiment, it becomes possible to completely eliminate asymmetry in the voltage-v-current characteristics such as shown in FIG. 9 ($|V^+| = |V^-|$). Accordingly, non-uniform display such as charge-up does not occur and a liquid crystal display having an extremely excellent display state can be obtained.

Figure 14:
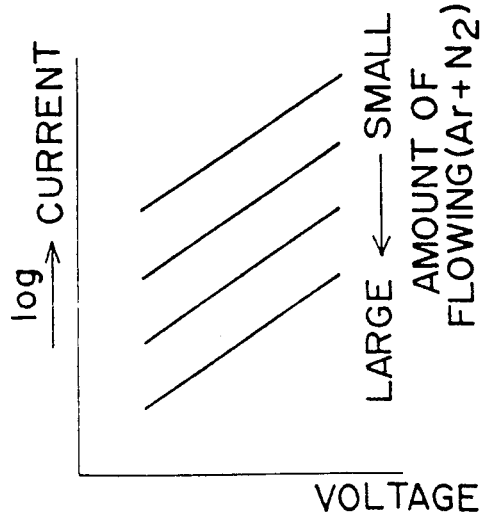
FIG. 14 shows the voltage-v-current characteristics of the non-linear resistance element when the flow rate of Ar+N$_2$ gas is changed.
Figure 15:
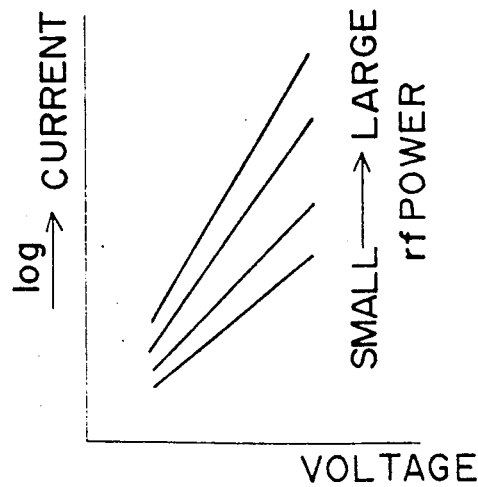
FIG. 15 shows the voltage-v-current characteristics of the non-linear resistance element when RF power is changed.

FIG. 14 shows the voltage-v-current characteristics when the flow rate of an $Ar+N_2$ gas is changed while RF power is kept constant in a non-linear resistance element of the type wherein the silicon nitride film is formed by reactive sputtering using silicon as the target and the $Ar+N_2$ gas containing 1 to 10% of $N_2$ gas and is sandwiched between ITO and Cr. FIG. 15 shows the voltage-v-current characteristics when the RF power is changed while the flow rate of the $Ar+N_2$ gas is kept constant when a similar non-linear resistance element is formed. As can be understood from FIG. 14, the resistance of the resulting non-linear resistance element can be changed by changing the flow rate of the $Ar+N_2$ gas and that the smaller the flow rate, the richer the silicon and the lower the resistance. As can be understood from FIG. 15, the flow of the current of the non-linear resistance element can be increased exponential-functionally by changing the power of RF, and the characteristics of the non-linear resistance element can be changed freely. The greater the RF power, the greater the sputtering ratio of the silicon target, and the resulting non-linear resistance element becomes more silicon-rich. However, there is a practical limit to the RF power because the stress inside the silicon nitride film becomes greater with increasing RF power and the problems such as peel of the film and current concentration occur.

Figure 8:
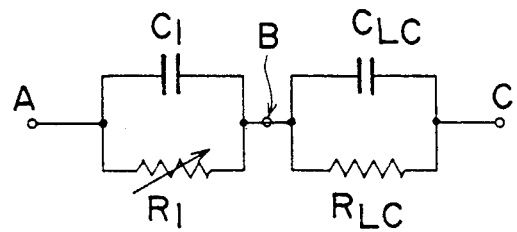
FIG. 8 is an equivalent circuit diagram of one pixel.
Figure 16:
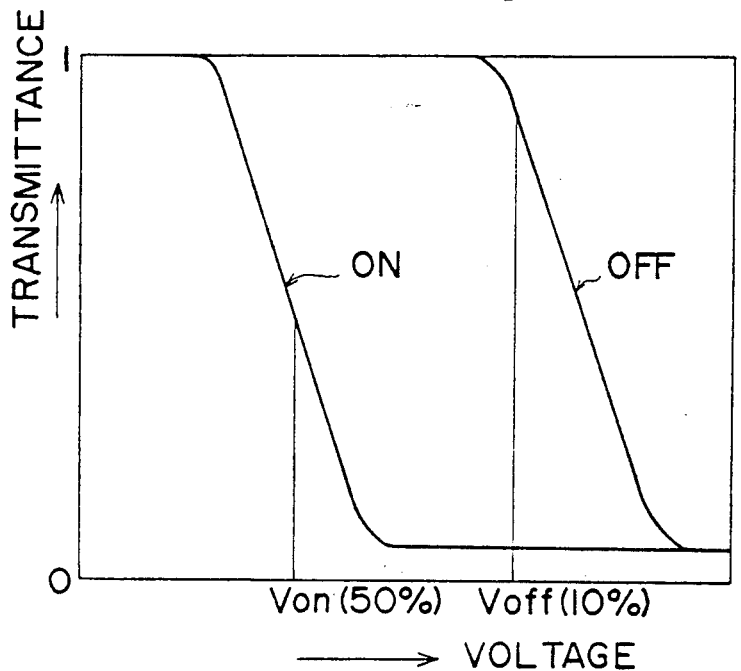
FIG. 16 shows voltage-v-transmittance characteristics of the liquid crystal display produced in the embodiment of the present invention.

FIG. 16 shows the voltage-v-transmittance of a liquid crystal display using a non-linear resistance element formed by conducting reactive sputtering using silicon as the target and the argon gas containing 1 to 10% of $N_2$ gas to deposit a non-linear resistance thin film and using ITO as the pixel electrode and aluminum silicon as the metallic wiring electrode. The bias ratio is from 1/6 to 1/10 bias. The smaller the bias ratio, the greater the difference between $V_{on}$ (50%) and $V_{off}$ (10%), that is, the margin. However, since the voltage level between $T-T_o$ in FIG. 9(A) becomes greater, too, the resistance value of $R_1$ in FIG. 8 drops and the leakage of the charge stored in $C_{LC}$ increases. Accordingly, when the bias ratio is below 1/5 bias, the width of $T-T_o$ becomes great in the case of multiple division (more than 400 division, for example) and the leakage quantity of the charge stored in $C_{LC}$ through the non-linear resistance element in $T_o$ becomes great. Therefore, the $V_{sat}$ voltage of the liquid crystal cannot be reached even when the $V_{op}$ voltage is raised. The optimum bias in this embodiment is 1/7 bias and the margin in this case is 5 to 6 V. The rise/fall response speed of the liquid crystal is 30 to 40 msec and is considerably faster than the response speed of ordinary TN, STN liquid panels.

Figure 17:
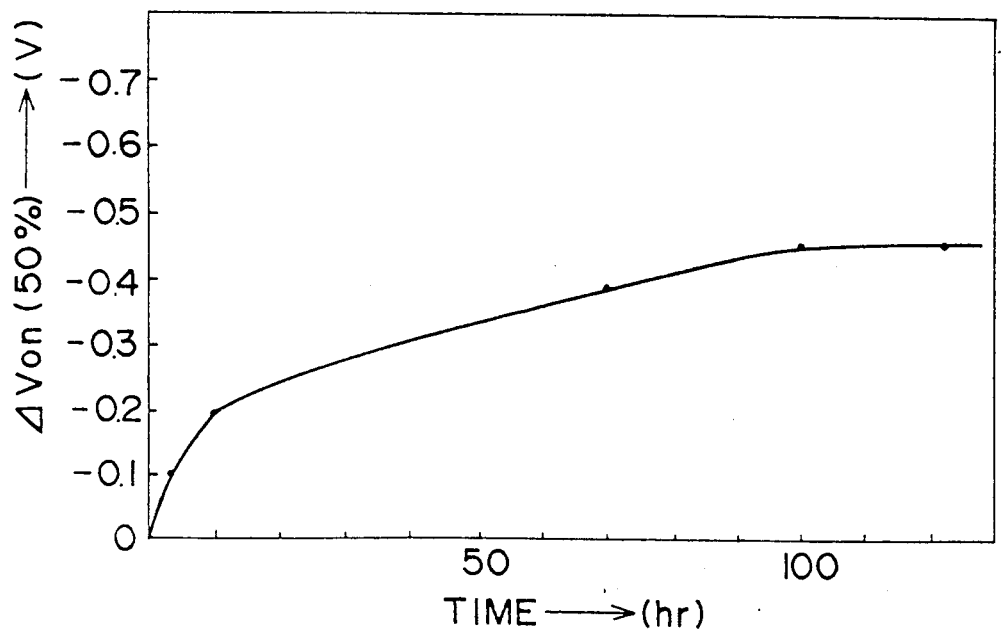
FIG. 17 is a diagram showing the voltage shift characteristics of the liquid crystal display produced in the embodiment of the present invention.

FIG. 17 shows the mode of the shift quantity of $V_{on}$ (50%) of the liquid crystal display produced in this embodiment with the passage of time. Shift of $-0.4 \sim -0.5$ V occurs within about 700 hours and saturation is attained. This voltage shift is in agreement with the shift quantity of the voltage-v-current characteristics of the non-linear resistance element but since it can be covered sufficiently by the margin $5 \sim 6$ V of $V_{on}$ (50%) and $V_{off}$(10%) of the liquid crystal display, degradation of the display state with time cannot be observed at all.

In the electro-optical device of the present invention described above, H contained in the a—Si base film is extremely small (H<1%) and the adverse influences due to the photoelectric effect can therefore be eliminated. Furthermore, asymmetry of polarity in the voltage-v-current characteristics can be eliminated and since the shift of the voltage is small, the difference of contrast between bright and dark atmospheres does not occur, and the electro-optical device having non-uniformity of display and with less degradation with time but having extremely excellent display state can be obtained.

From the production aspect, the production can be carried out safely because any harmful gas such as a silane gas is not used, and since the non-linear resistance film and the wiring electrode can be deposited continuously, the step time can be shorted and the production yield can be improved. Thus the present invention can provide an electro-optical device having a smaller number of, or not at all having any, defects.

Incidentally, although the embodiment given above explains the two-terminal device such as the a—$SiN_x$ and a—$SiO_2$ devices as the switching device, a similar effect can be obtained also form other two-terminal device such as a—$SiC_y$, a—$SiN_pO_Q$, TFTs, etc., by reducing the H content (below 1%) so long as a—Si is used as the base material.

What is claimed is:

1. An electro-optical device comprising:
a first substrate having an electrode on the inner surface thereof;
a second substrate opposed to the first substrate and having on the inner surface thereof a plurality of line electrodes, picture element electrodes and a plurality of switching elements, each switching element being comprised of amorphous silicon base material containing from 0 to less than 1% by weight of hydrogen, the line electrodes defining one of row and column electrodes and the electrode on the first substrate defining the other of the row and column electrodes; and
an electro-optical material layer sandwiched between the substrates and having optical properties which vary by applying a voltage thereacross.

2. An electro-optical device as claimed in claim 1; wherein the amorphous silicon base material consists substantially of $SiN_x$ or $SiO_y$ or $SiO_z$ or a combination of Si,N and O.

3. An electro-optical device as claimed in claim 1; wherein the switching element comprises a non-linear-resistive layer.

4. An electro-optical device as claimed in claim 3; wherein the non-linear-resistive layer comprises a reactively sputtered silicon and gas.

5. An electro-optical device as claimed in claim 4; wherein the gas contains N,O or C.

6. An electro-optical device as claimed in claim 4; wherein the silicon comprises one of single crystal silicon, polycrystal silicon and silicon oxide.

7. An electro-optical device comprising:
a pair of opposed substrates;
an electro-optical material layer sandwiched between the substrates;
a plurality of electro-optical switching elements disposed on an inner surface of one of the substrates, each of the switching elements including a first electrode layer, a switching material layer and a picture element electrode electrically connected to the first electrode layer through the switching material layer, the switching material layer comprising an amorphous silicon base material which contains from 0 to less than 1% by weight of hydrogen; and
a second electrode layer formed on an inner surface of the other of the substrates.

8. An electro-optical device as claimed in claim 7; wherein the switching material layer comprises a non-linear-resistive layer.

9. An electro-optical device as claimed in claim 8; wherein the first electrode layer defines one of row and column electrodes, and the second electrode layer defines the other of the row and column electrodes.

10. An electro-optical device as claimed in claim 7; wherein the switching material layer comprises a sputtered layer of the base material.

11. An electro-optical device comprising:
a pair of spaced-apart substrates having opposed inner surfaces;
a switching element disposed on the inner surface of one of the substrates, the switching element comprising a first electrode layer, a non-linear resistance layer composed of an amorphous silicon base material containing from 0 to less than 1% by weight of hydrogen, and an electrode electrically connected to the first electrode layer through the non-linear resistance layer;
an electro-optical material disposed between the inner surfaces of the substrates; and
a second electrode layer disposed on the inner surface of the other of the substrates and coacting with the first electrode layer to apply a voltage across the electro-optical material.

12. An electro-optical device according to claim 11; wherein the amorphous silicon base material comprises one of $SiN_x$, $SiO_y$ and $SiC_z$.

13. An electro-optical device according to claim 11; wherein the non-linear resistance layer comprises a layer of sputtered amorphous silicon base material.

14. An electro-optical device according to claim 11; wherein the non-linear resistance layer has a voltage-current characteristic having a symmetry of polarity.

15. A switching element for use in electro-optical devices and the like, comprising: a substrate; and a switching element formed on the substrate, the switching element comprising a first electrode disposed on the surface of the substrate, a non-linear resistance layer disposed on the substrate surface and overlying a portion of the first electrode, the non-linear resistance layer being composed of an amorphous silicon base material containing from 0 to less than 1% by weight of hydrogen, and a second electrode disposed on the non-linear resistance layer and overlying a portion of the first electrode, the second electrode being electrically connected to the first electrode through the non-linear resistance layer.

16. A switching element according to claim 15; wherein the amorphous silicon base material comprises one of $SiN_x$, $SiO_y$ and $SiC_z$.

17. A switching element according to claim 15; wherein the non-linear resistance layer comprises a layer of sputtered amorphous silicon base material.

18. A switching element according to claim 15; wherein the non-linear resistance layer has a voltage-current characteristic having a symmetry of polarity.

19. A method of producing an array of switching elements on a substrate, comprising the steps:
  providing a substrate having an array of first electrodes formed thereon;
  forming by sputtering a non-linear resistance layer composed of an amorphous silicon base material containing from 0 to less than 1% by weight of hydrogen on a portion on each of the first electrodes; and
  forming second electrodes on the non-linear resistance layer, each second electrode overlying a portion of a respective first electrode and being electrically connected thereto through the intervening non-linear resistance layer.

20. A method according to claim 19; wherein the step of forming by sputtering comprises depositing the amorphous silicon base material by reactive sputtering using a target composed of silicon and a gas containing another ingredient.

21. A method according to claim 20; wherein the another ingredient comprises one of N, O and C.

22. A method according to claim 21; wherein the target of silicon comprises one of silicon single crystal, silicon polycrystal and silicon oxide.

23. A method according to claim 20; wherein the step of forming by sputtering comprises carrying out the sputtering at an effective radio frequency power, and varying the flow rate of the gas while maintaining the radio frequency power constant to selectively control the resistance value of the non-linear resistance layer.

24. A method according to claim 20; wherein the step of forming by sputtering comprises carrying out the sputtering at an effective radio frequency power, and varying the radio frequency power while maintaining the flow rate of the gas constant to selectively control the resistance value of the non-linear resistance layer.

* * * * *